US012580677B2

(12) United States Patent
Sakic et al.

(10) Patent No.: US 12,580,677 B2
(45) Date of Patent: Mar. 17, 2026

(54) ERROR CORRECTION WITH PROACTIVE PACKET REPLACEMENT FOR REAL-TIME DATA STREAMING

(71) Applicant: NVIDIA Corporation, Santa Clara, CA (US)

(72) Inventors: Ermin Sakic, Munich (DE); Rajesh Medisetty, Hyderabad (IN); Sujit Kumar Sinha, Hyderabad (IN); Mohamadreza Marandian Hagh, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 479 days.

(21) Appl. No.: 17/893,391

(22) Filed: Aug. 23, 2022

(65) Prior Publication Data

US 2024/0072928 A1     Feb. 29, 2024

(51) Int. Cl.
H04L 1/00          (2006.01)
H04L 1/16          (2023.01)

(52) U.S. Cl.
CPC .......... H04L 1/0041 (2013.01); H04L 1/0057 (2013.01); H04L 1/16 (2013.01)

(58) Field of Classification Search
CPC ....... H04L 1/0041; H04L 1/0057; H04L 1/16; H04L 1/1819
See application file for complete search history.

(56) References Cited

U.S. PATENT DOCUMENTS

| | | | | |
|---|---|---|---|---|
| 6,675,340 B1 * | 1/2004 | Hardie | ................... | H04L 65/80 |
| | | | | 714/751 |
| 9,312,989 B2 * | 4/2016 | Begen | ................ | G06F 11/1443 |
| 10,721,033 B2 * | 7/2020 | Taniguchi | ............ | H04L 1/0041 |
| 10,784,993 B1 * | 9/2020 | Batra | .................... | H04L 1/1887 |
| 2005/0210355 A1 * | 9/2005 | Itoh | ........................ | H04L 1/0065 |
| | | | | 714/748 |
| 2005/0229074 A1 * | 10/2005 | Chawla | ................. | H04L 1/0045 |
| | | | | 714/758 |
| 2008/0250293 A1 * | 10/2008 | Taori | ...................... | H04B 7/155 |
| | | | | 714/E11.007 |
| 2008/0253369 A1 * | 10/2008 | Oran | ................... | H04L 43/0829 |
| | | | | 370/390 |
| 2008/0256409 A1 * | 10/2008 | Oran | ........................ | H04L 1/16 |
| | | | | 714/748 |
| 2009/0313519 A1 * | 12/2009 | Nagaraja | ............. | H04L 27/2614 |
| | | | | 714/751 |
| 2010/0005360 A1 * | 1/2010 | Begen | ................... | H04L 1/1845 |
| | | | | 714/751 |
| 2010/0146352 A1 * | 6/2010 | Suneya | ................. | H04L 1/0045 |
| | | | | 714/E11.131 |

(Continued)

FOREIGN PATENT DOCUMENTS

WO       WO-2010139265 A1 * 12/2010   ........... H04L 1/1621

*Primary Examiner* — Wutchung Chu

(74) *Attorney, Agent, or Firm* — Lowenstein Sandler LLP

(57) ABSTRACT

Disclosed are apparatuses, systems, and techniques that improve efficiency and quality of data streaming in time-sensitive network communications. The techniques include but are not limited to proactive replacement of packets in network communications that use forward error correction techniques. Proactive replacement of packets that have been lost or can potentially become lost reduces network latency and increases the number of timely communicated data messages.

21 Claims, 7 Drawing Sheets

(56) References Cited

U.S. PATENT DOCUMENTS

| | | | |
|---|---|---|---|
| 2010/0309865 A1* | 12/2010 | Kimura | H04L 1/0001 |
| | | | 370/328 |
| 2012/0079329 A1* | 3/2012 | Steinbach | H04N 19/65 |
| | | | 714/704 |
| 2012/0192026 A1* | 7/2012 | Chen | H04L 1/0066 |
| | | | 714/751 |
| 2014/0075260 A1* | 3/2014 | Murakami | H04L 1/1845 |
| | | | 714/751 |
| 2014/0126580 A1* | 5/2014 | Sampath | H04L 1/1858 |
| | | | 370/428 |
| 2015/0113351 A1* | 4/2015 | Sung | H04L 1/1825 |
| | | | 714/748 |
| 2016/0036564 A1* | 2/2016 | Krishnan | H04L 1/0045 |
| | | | 714/748 |
| 2018/0109357 A1* | 4/2018 | Sung | H04L 41/0654 |
| 2021/0351869 A1* | 11/2021 | Dash | H04L 1/0027 |

* cited by examiner

ERROR CORRECTION WITH PROACTIVE PACKET REPLACEMENT FOR REAL-TIME DATA STREAMING

TECHNICAL FIELD

At least one embodiment pertains to processing resources and techniques that are used to improve reliability and decrease latency of data transmission in lossy communication channels. For example, at least one embodiment pertains to proactive generation and communication of error correction packets in quantities that exceed a number of packets used during initial transmission of data. At least one embodiment pertains to efficiently responding to packet losses that maximize the likelihood of quick message recovery and minimize latency of data communications.

BACKGROUND

Erasure coding, or forward error correction (FEC), is used for transferring data in lossy (noisy) communication channels when random portions of data have some probability of being lost in transmission. FEC is particularly advantageous in applications that involve real-time streaming and limited time for retransmission of lost data. FEC involves generating additional redundant data and transmitting the redundant data together with the original data stream. Even when a portion of the original data is lost, the remaining data together with the redundant data can be sufficient to restore the full original data. The amount of the generated redundant (error correction) data can be optimized based on specific network conditions and specifics of the streaming applications. In particular, the amounts of the redundant data that are too small can lead to many data retransmissions (or lost messages) whereas too much redundant data clogs the communication channels and results in low rates of transmission.

BRIEF DESCRIPTION OF DRAWINGS

FIG. 2A depicts schematically one example of proactive packet replacement; FIG. 2B depicts another example of proactive packet replacement: FIG. 2C depicts yet another example of proactive packet replacement: FIG. 2D illustrates proactive packet replacement in an instance of a lost negative acknowledgment;

DETAILED DESCRIPTION

Figure 1:
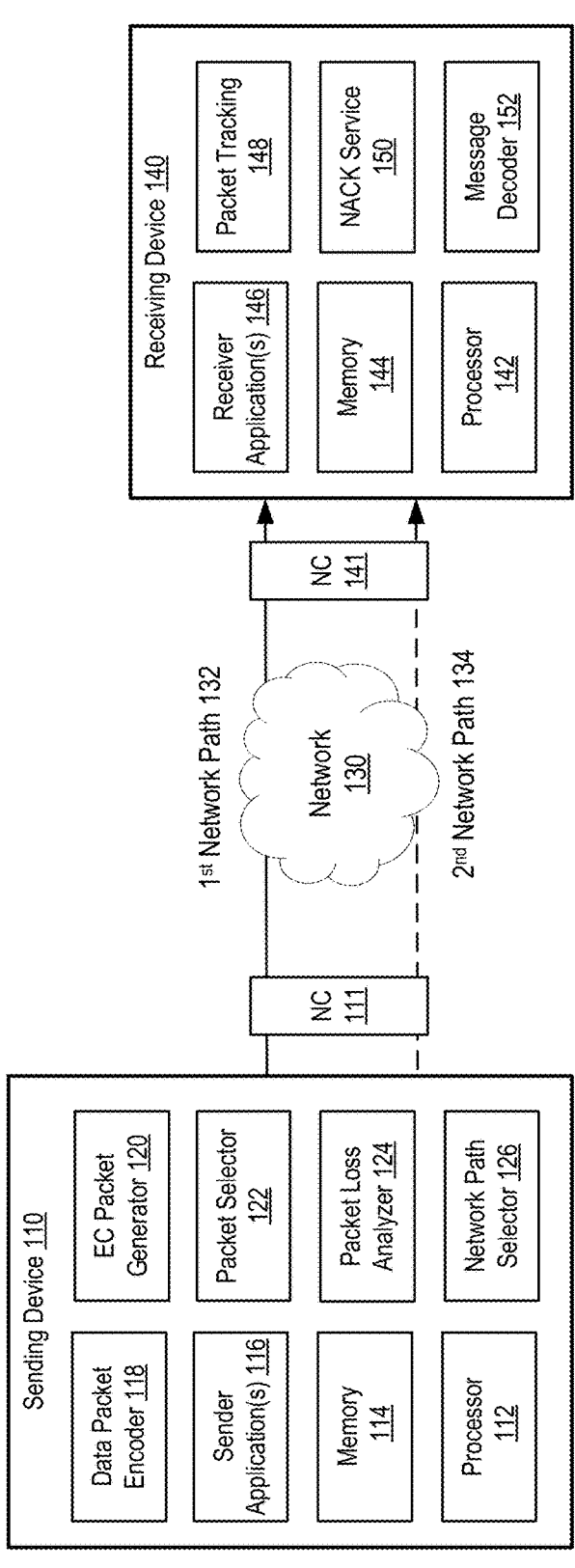
FIG. 1 is a block diagram of an example network architecture capable of implementing error correction with proactive packet replacement for reduced latency in time-sensitive applications, according to at least one embodiment.

For efficient network transmission, a message can be split (and/or encoded) into multiple packets ("symbols"). To improve the likelihood that a message of k packets is delivered successfully, the message can be expanded into a longer sequence of n packets in which at least a portion of the packets (e.g., n-k additional packets) is generated in such a way that fewer than n packets can be sufficient to recover the message. Some algorithms, including the Reed-Solomon error correction algorithm, allow recovery of the full message using any k of the n packets. Conceptually, the Reed-Solomon algorithm is based on the possibility of recovering a polynomial of k-1th order based on any k different points (numerical values of packets defined on the polynomial space) of the polynomial. Transmission of n polynomial points (packets), of which n-k points are redundant, allows a receiving device to recover the entire polynomial (and thus all k packets) provided that no more than n-k points are lost.

If more than n-k packets are lost, the message can still be recovered provided that some packets are retransmitted by a sending device, bringing the number of different packets to k. The receiving device can notify the sending device about the need to reseed missing packets by communicating one or more negative acknowledgment requests (NACKs) to the sending device. Existing embodiments that combine FEC with NACKs, however, have a number of shortcomings. Sending a NACK and waiting for a replacement packet leads to a delay equal to (or exceeding) a network round trip time (RTT). Replacement packets can still be lost during retransmission, which results in additional NACKs and additional RTI delays. In some instances, retransmissions following NACKs can transmit copies of packets whose delivery was merely delayed (e.g., due to network jitter and/or out-of-order packet transmission). This can result in multiple copies of the same packets being delivered and, therefore, in reduced network throughput while still not always ensuring message transmission, as some packets can be delivered multiple times while other packets (of the required minimum k packets) can yet be missing.

In some instances, NACKs generated by the receiving device can themselves be lost in transmission, and the sending device can remain unaware of the need to retransmit lost packets, unless the receiving device repeats the NACK. In time-sensitive applications, e.g., gaming applications, video streaming applications, audio streaming applications, and the like, multiple NACKs and retransmissions can result in all k packets necessary for message (e.g., video frame) reconstruction delivered too late for the message to be usable. Untimely decoded messages (e.g., video frames) reduce quality of the streaming services and reduce customer (e.g., viewer, gamer, etc.) satisfaction.

Aspects and embodiments of the instant disclosure address these and other technological challenges by disclosing methods and systems that decrease latency and improve throughput of network transmissions by efficiently combining FEC and NACK technologies. More specifically, the instant disclosure describes generating error correction (EC) packets and transmitting some of the generated EC packets together with the data to the receiving device. In the instances where some of the data and EC packets are missing, the sending device can receive one or more NACKs with identification of the missing packets. In some instances, NACKs can be generated even when some of the packets (data or EC) are only delayed and received, as a result, by the receiving device out of the expected order. In response, the sending device can transmit some of the missing packets and can further transmit one or more fresh FEC packets that have not been previously sent to the receiving device. Transmission of the fresh packet(s) increases the likelihood that the message can be successfully assembled since the missing packets in the earlier transmissions can still be delivered (albeit with a delay), e.g., while the retransmission of the fresh packets takes place. In some embodiments, the sending device can respond to NACK(s) with more packets than requested by the receiving device.

The number of excess packets can be determined based on the current network conditions, with more excess packets transmitted when network conditions are poor. Network conditions can be assessed based on a percentage of unde- livered packets in the initial transmission or a percentage of undelivered packets in a number of previous transmissions, e.g., those that occurred over a reference time interval (e.g., one second). In some embodiments, fresh EC packets may be taken from a store of EC packets generated prior to the initial transmission. In some embodiments, fresh EC packets may be generated on-the-fly, when the need arises, e.g., in response to a received NACK. In some embodiments, the receiving device may continuously monitor missing packets related to a given message and may identify multiple miss- ing packets as the sequence of transmitted packets arrives at the receiving device. Having identified a first missing packet (e.g., a first gap in the sequence of packets), the receiving device may generate and send a first NACK with the identification of the first missing packet. When a second missing packet (e.g., a second gap in the sequence of packets) is similarly identified, the receiving device can generate a second NACK with the identification of both the second missing packet and the first missing packet (if the first missing packet has not yet been received). The sending device may then timely adjust a number of EC packets in view of the latest NACK received. In some embodiments, fresh EC packets may be sent when a data packet has been requested by the receiving device. By sending EC packets, the sending device can proactively address possible losses of packets that may occur after the sending device responds to the most recent NACK. In some embodiments, packets sent in response to one or more NACKs may be transmitted using a network path that is different from the network path of the initial transmission.

The advantages of the disclosed techniques include but are not limited to reducing latency and increasing through- put of data communications in time-sensitive applications. In contrast to the existing techniques, which retransmit only the missing (data or EC) packets, the disclosed techniques provide additional packets proactively. As a result, the number of repeated requests is reduced and the likelihood of successful message delivery is improved. This improves user satisfaction and efficiency of network operations and reduces computational costs of data processing.

System Architecture

FIG. 1 is a block diagram of an example network archi- tecture 100 capable of implementing error correction with proactive packet replacement for reduced latency in time- sensitive applications, according to at least one embodiment. As depicted in FIG. 1, network architecture 100 can support operations of a sending device 110 communicatively coupled, over network 130, to a receiving device 140. Network 130 can be a public network (e.g., the Internet), a private network, a wireless network, a local area network (LAN), wide area network (WAN), a personal area network (PAN), or a combination thereof. Network operations of sending device 110 may be supported by a network control- ler (NC) 111 that may include a network adapter, a network interface card, and the like. Network controller 111 may be (or include) any suitable combination of hardware and software that facilitates and coordinates transmission and reception of data, including parsing data payloads into packets, adding headers, providing addresses, selecting net- work paths for data transmission, and performing any other mediation between sending device 110 and network 130. NC 141 may similarly mediate data exchanges between network 130 and receiving device 140. NC 111 and NC 141 may support are Transmission Control Protocol (TCP), Internet Protocol (IP), User Datagram Protocol (UDP), Converged Ethernet (RoCE) protocol, iWARP protocol, InfiniBand™ protocol, and the like. In some embodiments, network 130 may include any local bus connections, including but not limited to a Peripheral Component interconnect Express (PCIe) connection, a Compute Express Link (CXL) connec- tion, an NVLink™ connection, and the like. In some embodiments, network 130 may be fully implemented via local bus connections.

Sending device 110 may include processor 112, which may include one or more processing devices, such as CPUs, graphics processing units (GPUs), application-specific inte- grated circuits (ASICs), field-programmable gate arrays (FPGAs), or any combination thereof. Sending device 110 may further include memory 114, which may include one or more read-only memory (ROM) devices, cache memory devices, flash memory devices, static random access memory (SRAM) devices, dynamic random access memory (DRAM) devices, synchronous DRAM devices, or any other devices capable of storing and/or retrieving information.

Processor 112 and memory 114 may support one or more sender applications 116, which may be video streaming applications, audio streaming applications, gaming applica- tions, database applications, traffic control applications, pub- lic and/or private safety applications, cloud-based comput- ing applications, industrial manufacturing control applications, and the like. Sender application(s) 116 may generate a stream of data, portions of which may be referred to as frames or messages herein, for brevity and conciseness. Messages should be understood as any units of data gener- ated by sender application(s) 116. Messages may be pro- cessed by a data packet encoder 118 that may partition data into data packets of a specific size and format (e.g., a size and format that can be recognized and handled by NC 111). For example, each frame may be encoded via k data packets of 4 KB size, 16 KB size, 64 KB size, or any other size. In some embodiments, data packet encoder 118 may encrypt data packets using any suitable cryptographic techniques. An EC packet generator 120 may generate one or more EC packets (parity packets) for the data packets generated by data packet encoder 118. EC packets may be Reed-Solomon code packets, Bose-Chaudhuri-Hocquenghem code packets, Hamming code packets, or any other suitable error correc- tion packets. In some embodiments, for a set of k data packets EC, packet generator 120 may generate n-k EC packets that may be transmitted to receiving device 140 together with k data packets EC as part of a regular (initial) transmission. Additionally, EC packet generator 120 may generate one or more EC packets that are to be used as a store of EC packets for subsequent transmissions, in the instances where some of the packets in the initial transmis- sion are lost (or delayed).

A packet selector 122 may select, for retransmission, data packets and EC packets from the previously transmitted (but lost or delayed) data packets and EC packets. Packet selector 122 may also select one or more fresh packets from the store of EC packets, as described in more detail below. Packet selector 122 may operate in conjunction with a packet loss analyzer 124, which may collect statistics of packets lost in the latest transmission and a number of previous transmissions. Packet loss analyzer 124 may determine the current quality of network 130 connections and packet selector 122 may select the number and type of packets for retransmission, in view of this quality, in a way that maximizes the likelihood of prompt and successful retransmission of the data, as described in more detail below. A network path selector 126 may select a network path for each transmission or retransmission of data packets. For example, if the last transmission of the data and/or EC packets via a first network path 132 has resulted in a number (or fraction) of lost or delayed packets at or above a certain predetermined threshold, network path selector 126 may select a different network path, e.g., a second network path 134, for the next transmission or retransmission of packets.

Receiving device 140 may include processor 142 and memory 144 that may be implemented in any way described above in relation to processor 112 and memory 114 of sending device 110. A receiver application 146 may operate in conjunction with sender application 116 and may be capable of receiving and processing frames or messages generated by sender application 116. For example, sender application 116 may be a video streaming application that generates a stream of video frames compressed using a specific video codec standard. Receiver application 146 may receive the stream of the video frames from sending device 110 and may decode the video frames using a message decoder 152.

Receiving device 140 may further include packet tracking 148, which may be a software module that keeps track of delivered and missing data packets and or EC packets of each frame. For example, at the beginning of transmission of each new frame, data packet encoder 118 may transmit a packet that identifies the number of packets k that encode the new frame and the identifiers of these packets. Packet tracking 148 may identify each received frame and may also identify frames that are missing, e.g., as gaps in identifiers of the received frames. The identifiers of missing frames may be communicated, using a NACK service 150, to sending device 110 using one or more NACKs, as described in more detail below in relation to FIGS. 2A-C. Packet tracking 148 may be aware of the number k of data packets and/or n-k EC packets that are being transmitted, which may be a default number or a number that may be different for different frames and communicated by data packet encoder 118 individually for each frame. Once packet tracking 148 determines that k different packets have been received by receiving device 140, NACK service 150 may stop further requests for missing or additional packets, and message decoder 152 may decode the frame. Packet tracking 148 may maintain a clock and may stop further tracking of packets of a particular frame if k different packets have not been received within a predetermined time. Message decoder 152 may then forgo decoding of the frame or may interpolate (or extrapolate) the frame based on previously received frames.

It should be understood that example architecture 100 is intended as an illustration only and that other architectures can advantageously deploy systems and techniques of the instant disclosure.

Proactive Packet Replacement in Network Communications

Figure 2A:
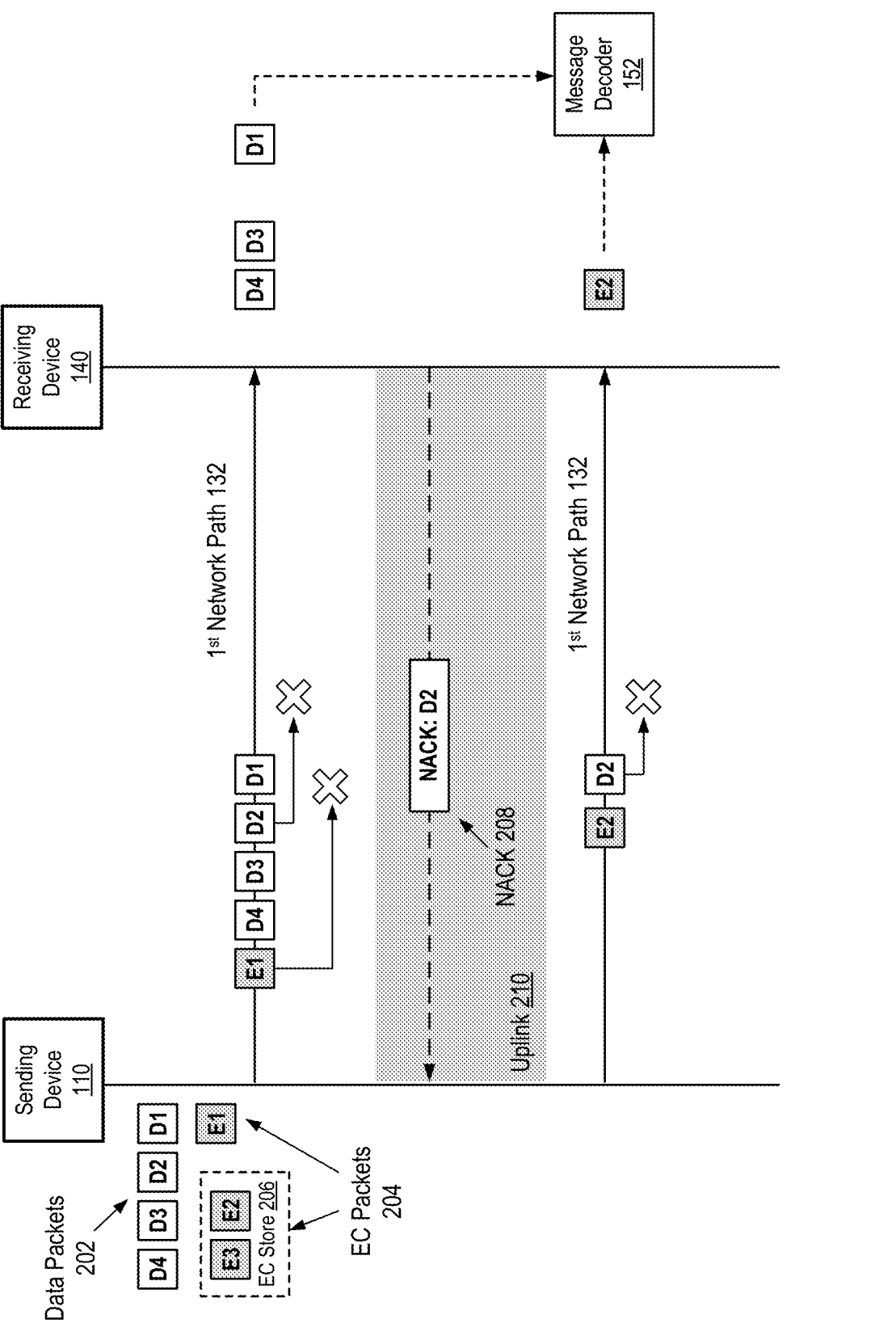
FIGS. 2A-2D are block diagrams illustrating examples of proactive packet replacement for reducing latency in time-sensitive network communications, in accordance with at least some embodiments.

FIGS. 2A-D are block diagrams illustrating examples of proactive packet replacement for reducing latency in time-sensitive network applications, in accordance with at least some embodiments. FIG. 2A depicts schematically a message generated by sending device 110 (e.g., by sending application 116 of FIG. 1). As shown, the message may be split (e.g., by data packet encoder 118) into multiple data packets 202 depicted with white squares. Although only four data packets D1 . . . D4 are shown for brevity, data packets 202 jointly representing a single message may include any number k (e.g., tens, hundreds, thousands, etc.) of packets. In addition to data packets 202, sending device 110 may generate one or more EC packets 204 (e.g., using EC packet generator 120). Although three EC packets 204, E1 . . . E3 (depicted with shaded squares) are shown, any number of EC packets 204 may be generated. In some embodiments, EC packets may include n-k packets intended for initial transmission plus any number m of additional packets may be generated and stored, e.g., in EC store 206. For example, as depicted in FIG. 2A, packet E1 may be included in the initial transmission whereas packets E2 and E3 may be maintained in EC store 206 for future use.

The initial transmission (indicated with the upper horizontal arrow) may include data packets 202 and at least some of EC packets 204, e.g., data packets D1, D2, D3, and D4 and EC packet E1. The initial transmission may use a first network path 132 for packet transmission, which may include a single route or a set of multiple routes. Packets in the initial transmission may be communicated to receiving device 140 sequentially, e.g., one packet at a time. In some embodiments, some or all of the packets may be communicated in parallel (e.g., along two or more separate routes), Some of the packets may be successfully received (e.g., D1, D3, and D4, as shown) by receiving device 140 whereas some of the packets (e.g., D2 and E1) may be lost in transmission, as depicted schematically with white crosses. Packet tracking 148 may determine whether a minimum number of different packet arrived that are sufficient for message decoding, e.g., k packets in Reed-Solomon error coding schemes. If the minimum number of packets are present, the received packets may be processed by message decoder 152 and the message (e.g., video frame) encoded in the received packets may be constructed and provided to receiver application 146 for further processing and use, e.g., for displaying the video frame to a viewer.

If fewer than the minimum number of packets have been received, packet tracking 148 may identify (e.g., as gaps in a sequence of expected packet identifiers) the missing packets. In response, NACK service 150 may generate one or more NACKs identifying the missing packets to the sending device. NACKs may be transmitted to sending device 110 during an uplink 210 portion of network communications. For example, NACK 208 may communicate to sending device 110 that packet D2 (e.g., the first lost packet) has not been received. Additional NACKs may be communicated responsive to discovering that other packets are missing, e.g., a NACK reporting the missing E1 packet (not shown in FIG. 2A).

Having received NACK 208, sending device 110 may respond with retransmitting a copy of the missing packet D2 (as indicated with the bottom horizontal arrow). Additionally, sending device 110 may proactively send a fresh EC packet from EC store 206, e.g., packet E2, as shown. Sending device 110 may still be unaware that packet E1 has also been lost. Nonetheless, sending device 110 may include a fresh EC packet (E2) to improve the likelihood of a successful communication. As a result, even when one of the packets D2 or E2 is lost in retransmission, the other successfully transmitted packet (e.g., packet E2 in the instant example) may be sufficient for timely message recovery by message decoder 152.

Figure 2B:
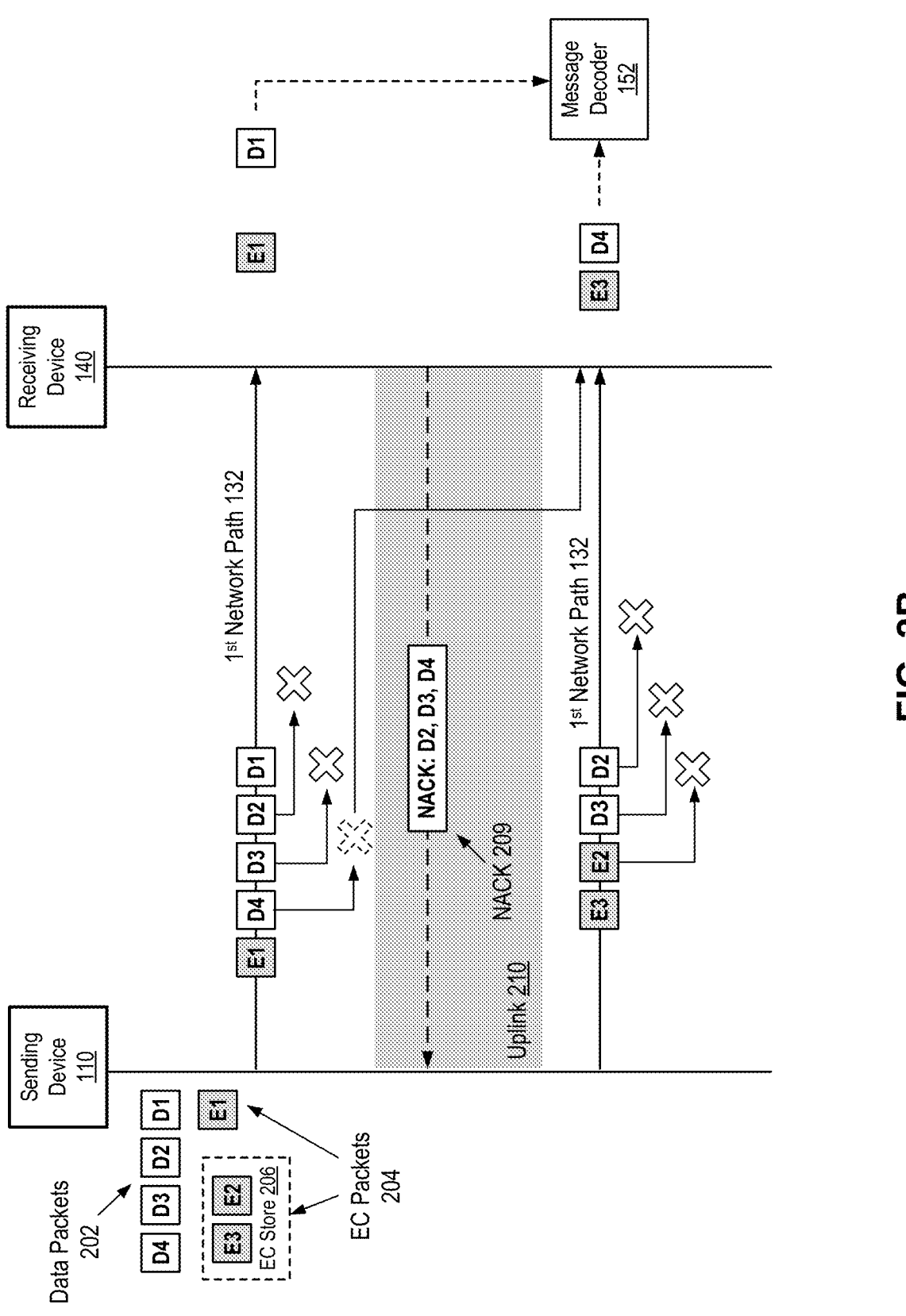

FIG. 2B depicts another example application of proactive packet replacement, in accordance with at least some embodiments. As illustrated in FIG. 2B, NACK notifications disclosed herein are capable of communicating identifications of multiple missing packets. This may significantly reduce latency of network transmissions. Depicted in FIG. 2B is an instance when a substantial number of data packets (e.g., D2, D3, and D4) are lost during initial transmission. Receiving device 140 may generate a single combined NACK 209 for multiple missing packets. For example, instead of generating a NACK for the first missing packet (e.g., D2), receiving device 140 (e.g., NACK service 150) may wait to collect additional information and generate combined NACK 209 for the first missing packet D2, the second missing packet (e.g., D3), and the third missing packet (e.g., D4). In some implementations, the receiving device may identify that a packet is missing when a subsequent packet is delivered. In some implementations, the receiving device may determine that a packet is missing using an estimated time of arrival of the packet. In some implementations, the receiving device may use a combination of these two mechanisms.

Having received combined NACK 209, sending device 110 may respond with retransmitting some of the missing packets (e.g., packets D2 and D3) and may forgo retransmission of other missing packets (e.g., packet D4). Additionally, sending device 110 may proactively send multiple fresh EC packets from EC store 206, e.g., packets E2 and E3. The number of fresh EC packets transmitted to receiving device 140 may depend on the number of missing packets identified in combined NACK 209, as described in more detail below. Although sending device 110 may be aware that packet D4 is also missing, sending device 110 may transmit one or more fresh EC packets (e.g., E2 and E3) instead of retransmitting packet D4. This may increase the chances of a successful and prompt delivery of k different (data or EC) packets sufficient for decoding of the message since a non-zero probability exists that the missing packets are merely delayed and are about to be delivered. In particular, data packet D4 of the original transmission may merely be delayed, and may still be delivered while retransmission of fresh EC packets is taking place. For example, as illustrated in FIG. 2B, even if retransmitted data packets D2 and D3 and EC packet E2 are all lost in transmission, a fresh EC packet E3 in combination with the delayed data packet D4 may be sufficient to decode the message (k=4 in the current example).

Figure 2C:
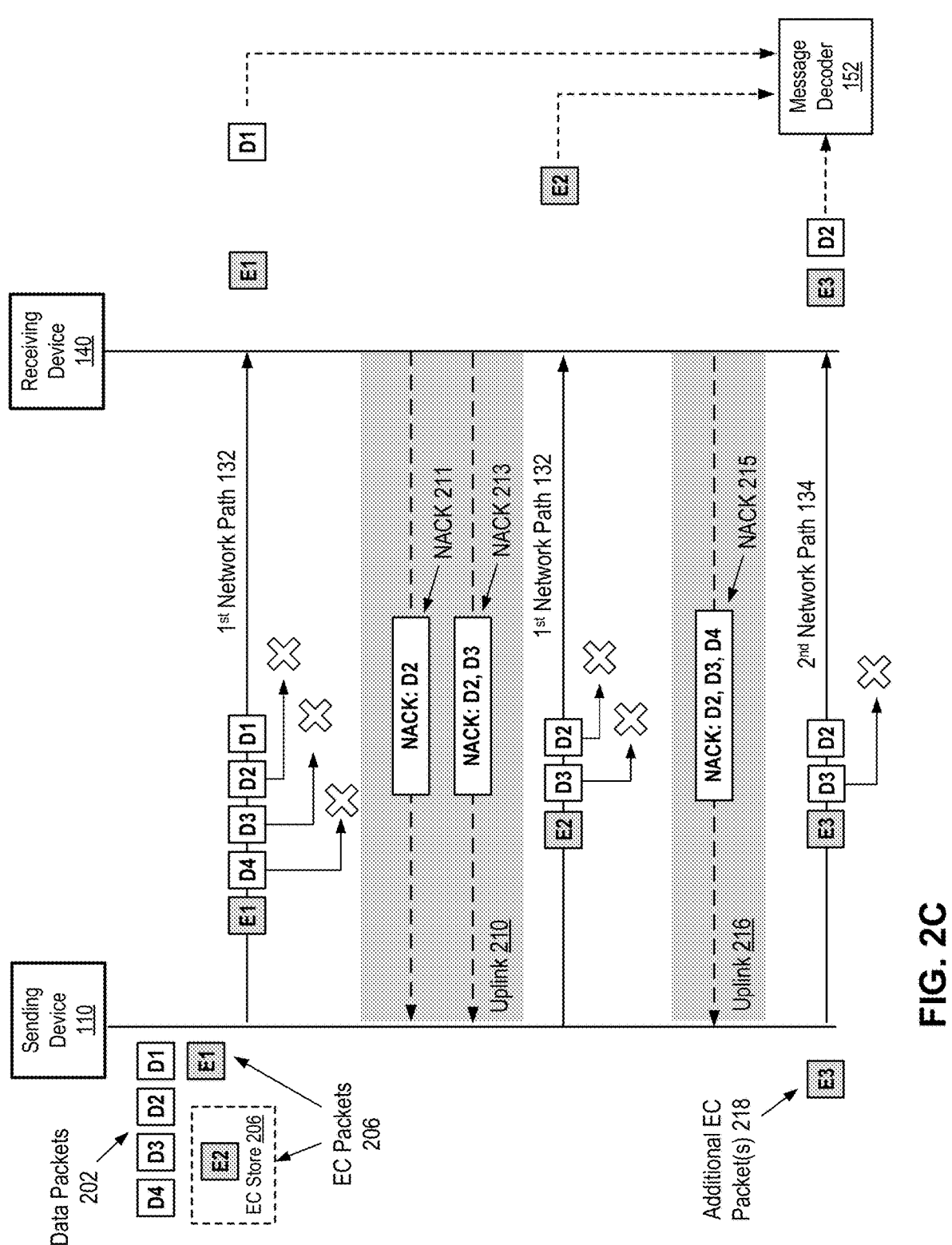

FIG. 2C depicts yet another example application of proactive packet replacement, in accordance with at least some embodiments. During the initial transmission, data packets D2, D3 and D4 may be lost. Receiving device 140 may generate a first NACK 211 after receiving device 140 detects that data packet D2 is missing (e.g., based on non-arrival of data packet D2 within estimated time). Subsequently, responsive to detecting that data packet D3 is also missing, receiving device 140 may generate a combined second NACK 213 requesting that sending device 110 provide replacement packets for two missing packets, D2 and D3. Responsive to receiving (during uplink 210) the combined NACK 213, sending device 110 may retransmit copies of the missing data packets D2 and D3 and may proactively send a fresh EC packet E2 from EC store 206. Packet E2 may successfully arrive at receiving device 140 whereas packets D2 and D3 may be lost.

Having received fewer packets than needed for message decoding (e.g., three of the minimum four packets is the instant example), receiving device 140 may generate a new NACK 215 with identifiers of transmitted but not received packets (e.g., data packets D2, D3, and D4). Generally, such packets may include missing packets from the latest transmission and packets missing from the initial transmission (whose replacement, as the last packet of the initial transmission, may have not been previously requested via the earlier NACKs). The new NACK 215 may be communicated to sensing device 110 during the next uplink 216.

Responsive to receiving the new combined NACK 213, sending device 110 may retransmit copies of the missing data packets D2 and D3 and may further generate one or more additional EC packets 218, e.g., new EC packet E3. Furthermore, receiving device 110 may deploy network path selector 126, which may determine that five out of eight previously attempted packet transmissions via the first network path 132 have failed to reach receiving device 140. Based on the high number of lost (or delayed) packets, network path selector may choose a different path for the next transmission, e.g., a second network path 134, and may transmit packets D2, D3, and E3 to receiving device 140 using this second network path 134. Similar to the first network path 132, the second network path 134 may include one or more routes of network communications (e.g., at least some of the packets D2, D3, and E3 may be routed differently than other packets). With one packet now missing by receiving device 140, successful transmission of any of the packets D2, D3, or E3 would be sufficient for decoding of the message by message decoder 152. (Two packets D2 and E3 are shown as being delivered over second network path 134 in FIG. 2C.)

Figure 2D:
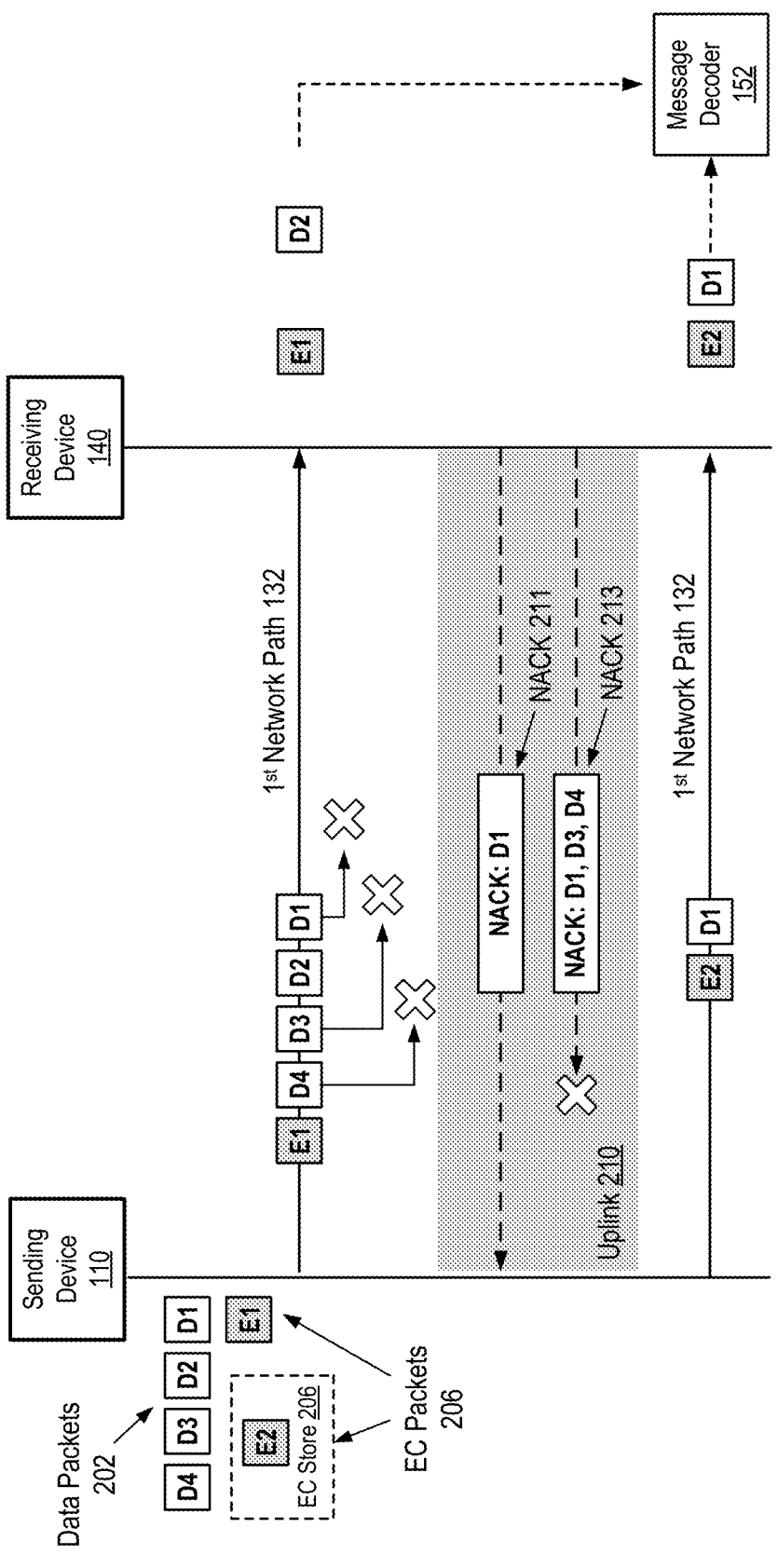

Proactive packet replacement is particularly advantageous in instances where some NACK communications are not delivered to sending device 110. FIG. 2D illustrates proactive packet replacement in an instance of a lost NACK, in accordance with at least some embodiments. During the initial transmission, data packets D1, D3, and D4 may be lost. Receiving device 140 may generate a first NACK 211 after receiving device 140 detects that data packet D1 is missing. Subsequently, responsive to detecting that data packets D3 and D4 are also missing, receiving device 140 may generate a combined second NACK 213 for all three missing packets, D1, D3, and D4. The combined NACK 213, however, may be lost and never delivered to sending device 110. Correspondingly, sending device 110 may be unaware that receiving device 140 is missing at least two packets for successful decoding of the message. Nonetheless, by retransmitting data packet D1 (requested via the successfully delivered first NACK 211) together with a proactively included fresh EC packet E2, the sending device 110 creates a possibility that the message will be successfully decoded without further back-and-forth NACK mediation. In particular, if packets D1 and E2 are delivered successfully, receiving device 140 will be in possession of the minimum of packets sufficient for successful message decoding.

In some embodiments, the number of EC packets transmitted proactively may be determined dynamically based on the current state of the network. For example, packet loss analyzer 124 of FIG. 1 may determine that during a reference time, e.g., the last 0.1 second, 1 second, or any other suitable reference time, M out of N packets have been successfully transmitted to receiving device 140 and that the current probability of transmission is, therefore, $w=M/N$. Correspondingly, when d packets have to be transmitted, a total number p of packets may be prepared and sent to receiving device 140 such that p is large enough to ensure at least a target probability $w_T$ (e.g., 90%, 95%, etc.) of successful transmission of d or more packets. For example, assuming that successful transmission of each packet is independent of transmission of other packets, the probability of transmission of exactly m packets may be modeled as $$w_m(p) = \frac{p!}{m!(p-m)!} w^m (1-w)^{p-m}.$$

The probability w(d, p) that at least d packets are successfully transmitted may then be computed as $w(d, p) = \Sigma_{m=d}^{p} w_m(p)$. Correspondingly, the minimum number of packets $p_{min}$ (d) to be prepared may be determined from the equation, $w(d, p_{min}) = w_T$, with the solution rounded up to the nearest integer p. The described modeling may be performed prior to the initial transmission of packets and/or prior to any subsequent retransmission. For example, for the initial transmission, d may be the number of data packets to be transmitted (e.g., k packets, as previously referenced in conjunction with FIG. 1 and FIGS. 2A-D), and p may be the total number of packets (e.g., n packets, as previously referenced). Similarly, for a subsequent retransmission, d may be the number of the missing data packets (e.g., the number of packets that are still missing by receiving device 140 for the successful decoding of the message) and p may be the total number of packets to be transmitted. At least some of the p packets may be fresh EC packets that may be taken from EC store 206 or may be newly generated EC packets, e.g., as described above in conjunction with FIGS. 2A-D.

Figure 3:
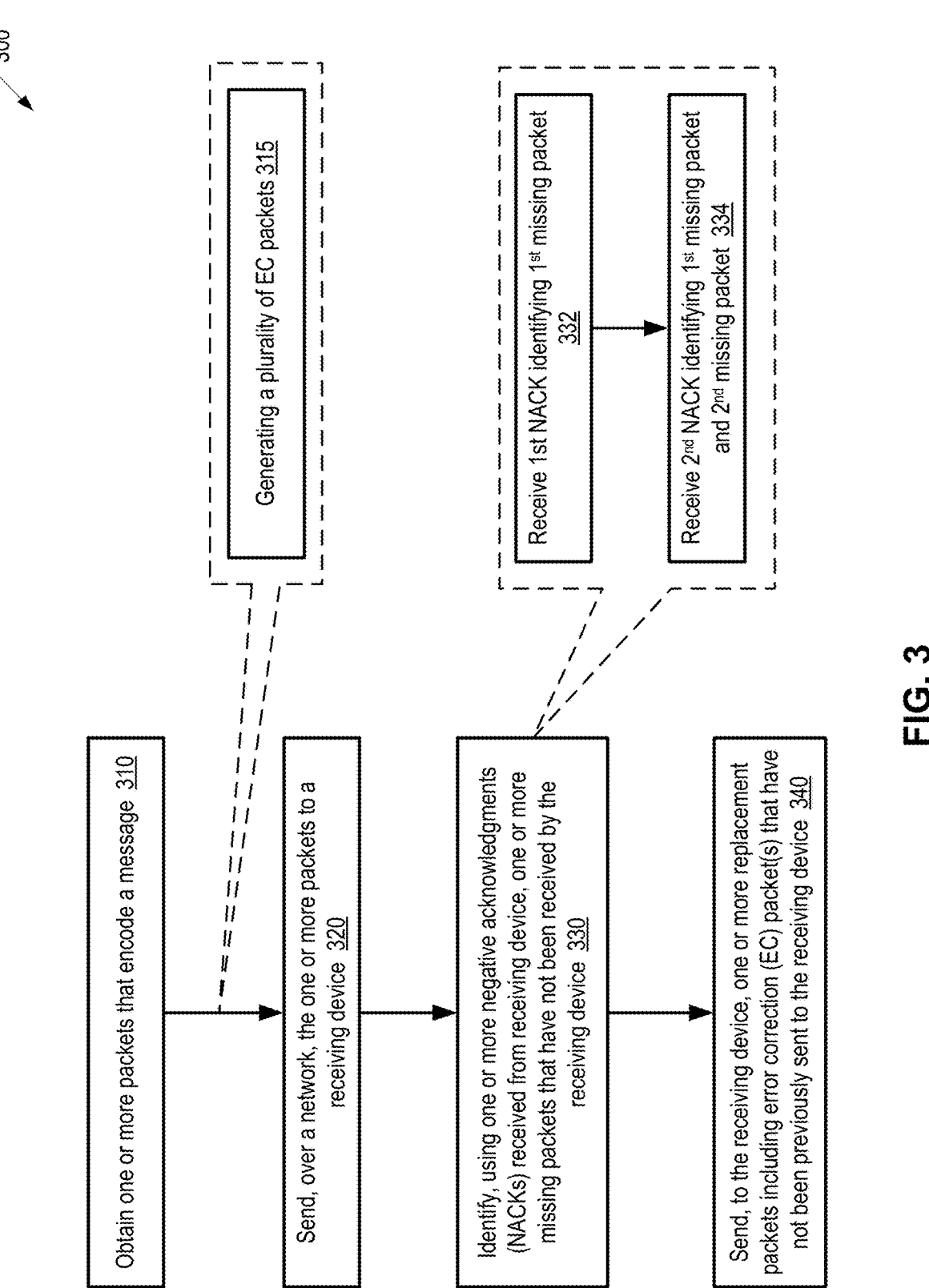
FIG. 3 is a flow diagram of an example method of proactive packet replacement for reducing latency in time-sensitive network communications, according to some embodiments of the present disclosure.

FIG. 3 is a flow diagram of an example method 300 of proactive packet replacement for reducing latency in time-sensitive network communications, according to some embodiments of the present disclosure. Method 300 may be performed by one or more processing units (e.g., CPUs and/or GPUs), which may include (or communicate with) one or more memory devices. In at least one embodiment, method 300 may be performed by processing units of sending device 110 (e.g., processor 112) and/or processing units of receiving device 140 (e.g., processor 142). In at least one embodiment, method 300 may be performed by multiple processing threads (e.g., CPU threads and/or GPU threads), each thread executing one or more individual functions, routines, subroutines, or operations of the method. In at least one embodiment, processing threads implementing method 300 may be synchronized (e.g., using semaphores, critical sections, and/or other thread synchronization mechanisms). Alternatively, processing threads implementing method 300 may be executed asynchronously with respect to each other. Various operations of method 300 may be performed in a different order compared with the order shown in FIG. 3. Some operations of method 300 may be performed concurrently with other operations. In at least one embodiment, one or more operations shown in FIG. 3 may not always be performed.

Method 300 described herein may be used for a variety of purposes. By way of example and without limitation, these purposes may include systems or applications for machine control, machine locomotion, machine driving, synthetic data generation, real-time data streaming, model training, perception, augmented reality, virtual reality, mixed reality, robotics, security and surveillance, autonomous or semi-autonomous machine applications, deep learning, environment simulation, data center processing, conversational AI, light transport simulation (e.g., my tracing, path tracing, etc.), collaborative content creation for 3D assets, digital twin systems, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for executing real-time data streaming applications, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

At block 310, processing units performing method 300 may obtain one or more packets that encode a message. The packets may be generated by the sending device, retrieved from a memory accessible to the sending device, or received by the sending device from another device. The one or more packets may be pre-processed for transmission to a receiving device over any suitable network. As part of pre-processing, method 300 may include, at block 315, prior to sending the one or more packets to the receiving device, generating a plurality of EC packets. Any EC packets of the plurality of EC packets may be Reed-Solomon EC packets generated to enable recovery of the encoded message. In some embodiments, EC packets may be Bose-Chaudhuri-Hocquenghem EC packets, Hamming EC packets, or packets implementing any other suitable EC code. In some embodiments, a number of the plurality of EC packets generated prior to sending the one or more packets to the receiving device may be determined based on a number of packets not received by the receiving device over a reference interval of time. The reference time may be previous 0.1 second, 1 second, 5 second, 10 second, and the like, and may be selected in view of a volatility of conditions of the network, with shorter reference times used when the conditions are subject to fast changes.

At block 320, the processing units performing method 300 may send, over the network, the one or more packets to the receiving device. At block 330, method 300 may continue with the processing units identifying, using one or more negative acknowledgments (NACKs) received from the receiving device, one or more missing packets. The one or more missing packets may be packets sent to the receiving device (at block 320) that have not been received by the receiving device. As illustrated with the bottom callow portion of FIG. 3, identifying the one or more missing packets may include receiving, at block 332, a first NACK of the one or more NACKS. The first NACK may identify at least a first missing packet of the one or more missing packets. Subsequently, when the receiving device determines that a second packet is missing, the receiving device may generate a second NACK that identifies both missing packets. Correspondingly, at block 334, the receiving device may receive the second NACK, which identifies at least the first missing packet and the second missing packet (and may identify any other additional missing packets).

At block 340, the processing units may send, to the receiving device, one or more replacement packets. The replacement packets may include a first error correction (EC) packet for the encoded message. In some embodiments, the first EC packet may be one of the plurality of EC packets generated at block 315 (and stored in EC store). In some embodiments, the first EC packet may be a packet that has not been previously sent to the receiving device. In some embodiments, the first EC packet may be generated in response to receiving the one or more NACKs. In some embodiments, the replacement packets sent to the receiving device may include multiple packets that have not been previously sent to the receiving device, e.g., both the first EC packet and a second EC packet (and may include any other additional EC packets). The second EC packet may also be one of the plurality of EC packets generated at block 315 (and stored in EC store), In some embodiments, the second EC packet may be generated in response to receiving a NACK, e.g., the first NACK received as part of block 332 or the second NACK received as part of block 334.

In some embodiments, a number of the one or more replacement packets may exceed the number of the one or more missing packets. In some embodiments, the one or more replacement packets may include some or each of the one or more missing packets, in addition to new packets that have not been previously transmitted to the receiving device. In some embodiments, the one or more replacement packets may include multiple, e.g., two or more, EC packets, with the number of the replacement packets determined based on the number of the missing packets. For example, the number of replacement packets may exceed the number of the missing packets, with the number of excess replacement packets being proportional to the number of missing packets. In some embodiments, at least some missing EC packets may be retransmitted, e.g., the one or more replacement packets may include the second EC packet for the encoded message, wherein the second EC packet is a copy of a missing EC packet originally transmitted to the receiving device. In some embodiments, given a possibility that the missing packets may be merely delayed rather than lost, some of the missing (data or EC) packets are not retransmitted, so that a copy of at least one packet of the one or more missing packets is not included in the one or more replacement packets. In some embodiments, at least one replacement packet of the one or more replacement packets may be sent to the receiving device over a network path that is different from a network path that was used to send the one or more packets.

Figure 4:
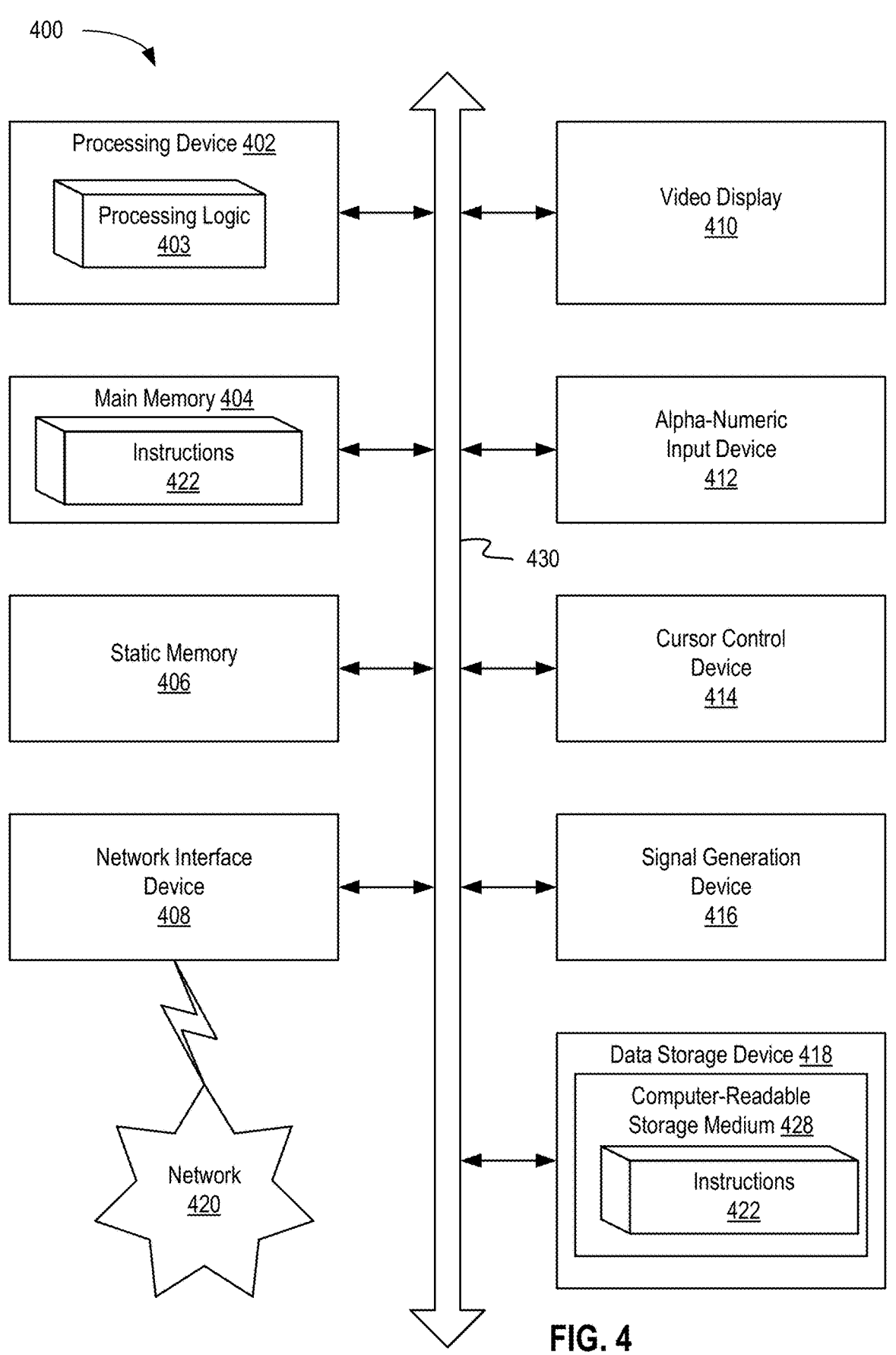
FIG. 4 depicts a block diagram of an example computer device capable of enabling proactive packet replacement for reducing latency in time-sensitive network communications, in accordance with at least some embodiments of the present disclosure.

FIG. 4 depicts a block diagram of an example computer device 400 capable of enabling proactive packet replacement for reducing latency in time-sensitive network communications, in accordance with at least some embodiments of the present disclosure. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 400 can include a processing device 402 (also referred to as a processor or CPU), a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 (which can include processing logic 403) represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 402 can be configured to execute instructions performing method 300 of proactive packet replacement for reducing latency in time-sensitive network communications.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the present disclosure, executable instructions 422 can comprise executable instructions performing method 300 of proactive packet replacement for reducing latency in time-sensitive network communications.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, com- bined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stop- ping," "loading," "copying," "throwing," "replacing," "per- forming," or the like, refer to the action and processes of a computer system, or similar electronic computing device, that manipulates and transforms data represented as physical (electronic) quantities within the computer system's regis- ters and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-acces- sible storage media, or any type of media suitable for storing electronic instructions, each coupled to a computer system bus.

The methods and displays presented herein are not inher- ently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of program- ming languages can be used to implement the teachings of the present disclosure.

It is to be understood that the above description is intended to be illustrative, and not restrictive. Many other implementation examples will be apparent to those of skill in the art upon reading and understanding the above descrip- tion. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustra- tive sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illus- trated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be con- strued as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contra- dicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explic- itly or by context. Further, unless stated otherwise or oth- erwise clear from context, phrase "based on" means "based at least in part on" and not "based solely on."

Operations of processes described herein can be per- formed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

sending, using a network, one or more packets to a receiving device, the one or more packets corresponding to an encoded message and comprising a first error correction (EC) packet associated with the encoded message;

identifying one or more missing packets using one or more negative acknowledgments (NACKs) received from the receiving device, the one or more missing packets comprising at least one packet of the one or more packets sent to the receiving device that was not received by the receiving device; and sending, to the receiving device, one or more replacement packets comprising a second EC packet associated with the encoded message, wherein the second EC packet represents a packet that has been generated prior to sending the one or more packets to the receiving device and not previously sent to the receiving device, wherein a number of the one or more replacement packets corresponds to a number of packets not received by the receiving device over a reference interval of time.

2. The method of claim 1, wherein a number of the one or more replacement packets exceeds a number of the one or more missing packets.

3. The method of claim 1, wherein the one or more replacement packets further comprise each of the one or more missing packets.

4. The method of claim 1, wherein identifying the one or more missing packets comprises:

receiving a first NACK of the one or more NACKs, wherein the first NACK identifies at least a first missing packet of the one or more missing packets; and receiving a second NACK of the one or more NACKs, wherein the second NACK identifies at least (i) the first missing packet and (ii) a second missing packet of the one or more missing packets.

5. The method of claim 1, further comprising:

prior to sending the one or more packets to the receiving device, generating a plurality of EC packets, wherein the plurality of EC packets comprises the first EC packet and the second EC packet.

6. The method of claim 5, wherein the plurality of EC packets comprises a third EC packet, and wherein the one or more packets sent to the receiving device comprise the third EC packet.

7. The method of claim 1, wherein the second EC packet is sent in response to receiving the one or more NACKs.

8. The method of claim 1, wherein the one or more replacement packets comprise two or more EC packets, and wherein a number of the two or more EC packets is determined based at least on a number of the one or more missing packets.

9. The method of claim 1, wherein at least one replacement packet of the one or more replacement packets is sent to the receiving device over a network path that is different from a network path that was used to send the one or more packets.

10. The method of claim 1, wherein the one or more replacement packets further comprise a copy of the first EC packet.

11. The method of claim 1, wherein a copy of at least one packet of the one or more missing packets is not included in the one or more replacement packets.

12. The method of claim 1, wherein the first EC packet is encoded using a Reed-Solomon encoding.

13. A system comprising:

a processing device to:

send, using a network, one or more packets to a receiving device, the one or more packets corresponding to an encoded message and comprising a first error correction (EC) packet associated with the encoded message;

identify one or more missing packets using one or more negative acknowledgments (NACKs) received from the receiving device, the one or more missing packets comprising at least one packet of the one or more packets sent to the receiving device that was not received by the receiving device; and send, to the receiving device, one or more replacement packets comprising a second EC packet associated with the encoded message, wherein the second EC packet represents a packet that has been generated prior to sending the one or more packets to the receiving device and not previously sent to the receiving device, wherein a number of the one or more replacement packets corresponds to a number of packets not received by the receiving device over a reference interval of time.

14. The system of claim 13, wherein a number of the one or more replacement packets exceeds a number of the one or more missing packets.

15. The system of claim 13, wherein to identify the one or more missing packets, the processing device is to:

receive a first NACK of the one or more NACKs, wherein the first NACK identifies at least a first missing packet of the one or more missing packets; and receive a second NACK of the one or more NACKs, wherein the second NACK identifies at least (i) the first missing packet and (ii) a second missing packet of the one or more missing packets.

16. The system of claim 13, wherein the processing device is to:

prior to sending the one or more packets to the receiving device, generate a plurality of EC packets, wherein the plurality of EC packets comprises the first EC packet and the second EC packet.

17. The system of claim 13, wherein the one or more replacement packets comprise two or more EC packets, and wherein a number of the two or more EC packets is determined based at least on a number of the one or more missing packets.

18. The system of claim 13, wherein at least one replacement packet of the one or more replacement packets is sent to the receiving device over a network path that is different from a network path that was used to send the one or more packets.

19. The system of claim 13, wherein a copy of at least one packet of the one or more missing packets is not included in the one or more replacement packets.

20. A processor comprising:

one or more processing units to:

send, using a network, one or more packets to a receiving device, the one or more packets corresponding to an encoded message and comprising a first error correction (EC) packet associated with the encoded message;

identify one or more missing packets using one or more negative acknowledgments (NACKs) received from the receiving device, the one or more missing packets comprising at least one packet of the one or more packets sent to the receiving device that was not received by the receiving device; and send, to the receiving device, one or more replacement packets comprising a second EC packet associated with the encoded message, wherein the second EC packet represents a packet that has been generated prior to sending the one or more packets to the receiving device and not previously sent to the receiving device, wherein a number of the one or more replacement packets corresponds to a number of packets not received by the receiving device over a reference interval of time.

21. The processor of claim 20, wherein the processor is comprised in at least one of:

a control system for an autonomous or semi-autonomous machine;

a perception system for an autonomous or semi-autonomous machine;

a system for executing one or more real-time streaming applications;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

\* \* \* \* \*